April 8, 1930.  P. FABIAN  1,754,165

LIP PROTECTING HOLDFAST

Filed Oct. 9, 1929

Inventor
Paul Fabian

Patented Apr. 8, 1930

1,754,165

UNITED STATES PATENT OFFICE

PAUL FABIAN, OF CHEMNITZ, GERMANY

LIP-PROTECTING HOLDFAST

Application filed October 9, 1929, Serial No. 398,442, and in Germany October 22, 1927.

I am aware it is old in the art to provide lip protectors which are connected with a rubber blade to be placed on a drinking cup to protect the lips of a person using the cup for drinking purposes.

Such devices are not so constructed as to readily prevent the transfer of infectious diseases due to the fact that they are difficult to clean after use.

According to this invention I employ a rubber strip which can be easily removed and cleaned and then quickly replaced and securely associated with a lip protector. In other words, my improved device provides a simple, sanitary lip protecting device for drinking cups.

My invention is illustrated in the accompanying drawings, in which.

1 indicates a metallic resilient protecting plate, curved in plan view to readily fit over the edge of a cup. The metal protector comprises an inner curved plate $a$, from the upper edge of which the metal is split at $a'$ and bent downwardly to fit over the edge of a cup and to provide depending resilient fingers $b$, $b$, $c$ designed to engage the outside of the cup. The ends of the resilient fingers are bent outwardly slightly to form edges for conveniently releasing the protector and at the same time provide means for slipping the fingers over the cup edge when applying the device. The inner curved plate $a$ is formed with several openings $a^2$, designed to receive lugs $d'$ projecting from a rubber strip $d$ snugly engaging the inside of plate $a$, but spaced from the inner faces of the depending fingers $b$, $b$, $c$.

Figure 1:
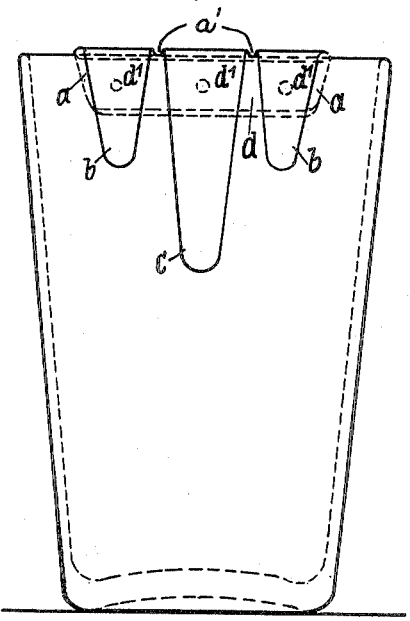
Figure 1 illustrates a front elevation of the improved lip protector.
Figure 2:
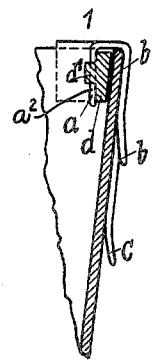
Figure 2 is a vertical section of the lip protector when placed on the rim of a cup.
Figures 3, 4:
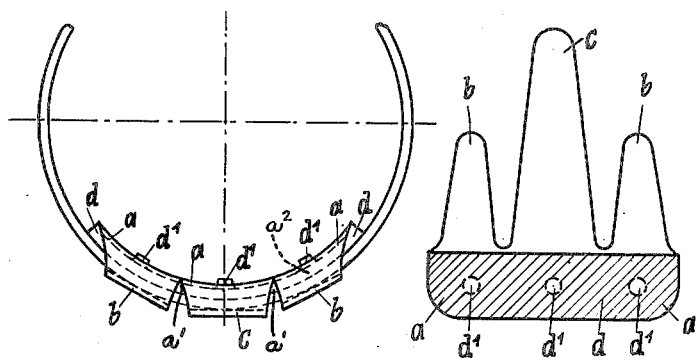
Figure 3 is a plan view of Figure 1, with parts broken away.
Figure 4 is a view of the lip protector with the rubber strip shown in section.

In use, a rubber strip $d$ is fitted on the inner side of the inner curved plate $a$, the lugs $d'$ fitting in the openings $a^2$ in plate $a$. When the metal protecting plate and rubber strip are assembled, the device is forced down on the upper edge of a cup, with the rubber strip engaging the inner surface of the cup, and the depending fingers engaging the outer surface of said cup, as best shown in Figure 2.

The depending fingers are resilient and when the device is engaged on a cup the fingers insure a light grip and hold said device in operative position.

To remove the device, upward pressure is applied on the fingers or the under side of the rubber strip. If it be desired to remove the strip for cleaning purposes, slight pressure is exerted on the lugs $d'$ to disengage same from the holes $a^2$, when it will fall from the metal protector. Obviously, the rubber strip can be conveniently removed and a new one supplied.

By the construction described it is evident I have provided a simple and convenient sanitary device readily applied to or removed from a cup, and one which can be conveniently cleaned at will.

What I claim is:

1. A lip protector comprising a curved resilient metal plate formed with openings and spaced resilient fingers extending from the upper edge of said plate, and a rubber strip having lugs to engage in the openings and snugly fitted against the inner surface of the inner plate and spaced from the depending fingers to engage over the edge of a drinking cup.

2. A lip protector comprising a curved resilient plate having depending spaced apart bent portions to fit over the edge of a cup, and a resilient strip engaging the inner bent portion, and means consisting of lugs engaged in apertures for holding the resilient strip in position.

Leipzig, Germany, the 25th day of September, 1929.

PAUL FABIAN.